M. ROBBINS.
OIL CAN.
No. 69,485. Patented Oct. 1, 1867.
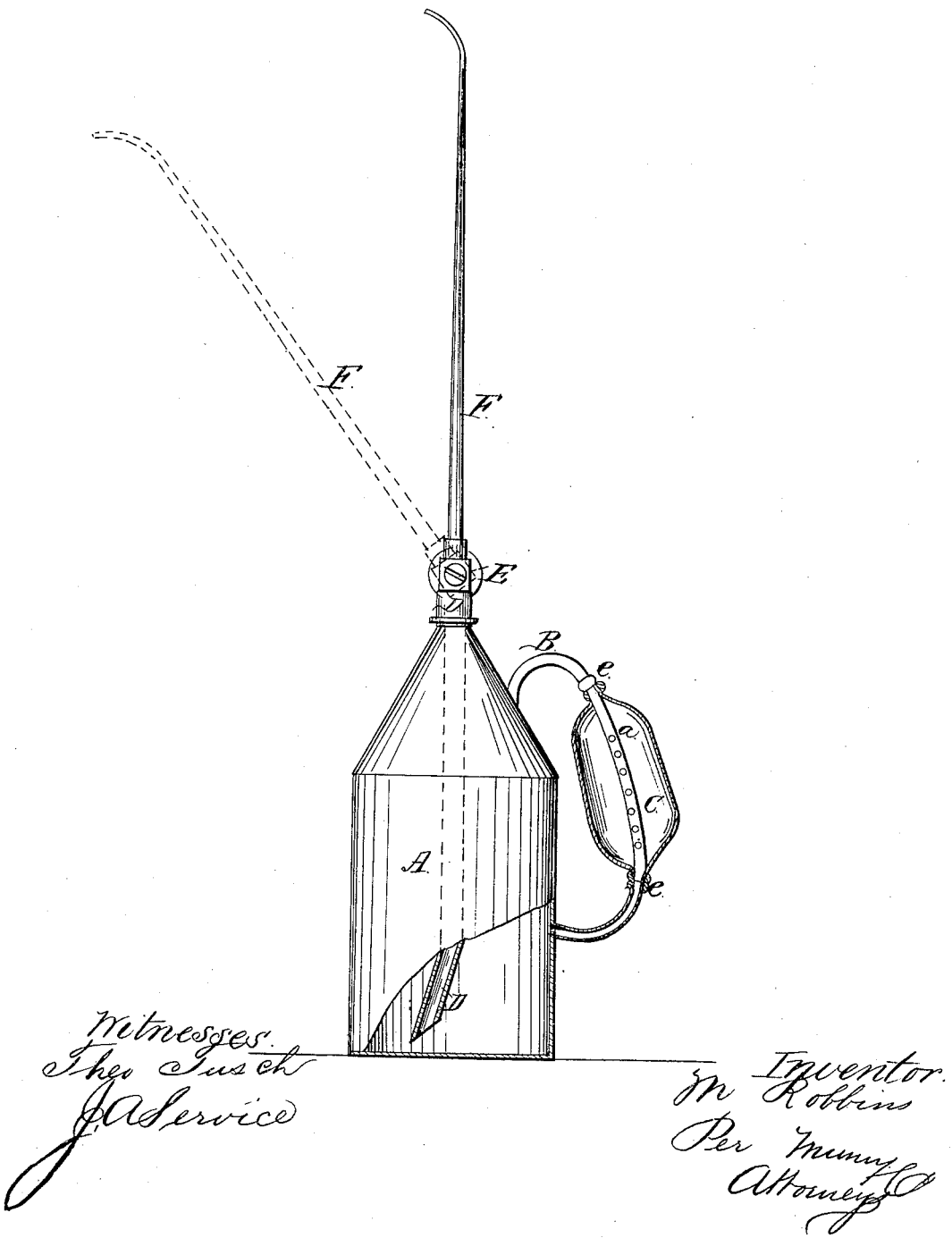

United States Patent Office.

MARTIN ROBBINS, OF CINCINNATI, OHIO.

Letters Patent No. 69,485, dated October 1, 1867.

---

IMPROVEMENT IN OIL-CANS.

---

The Schedule referred to in these Letters Patent and making part of the same.

---

TO ALL WHOM IT MAY CONCERN:

Be it known that I, MARTIN ROBBINS, of Cincinnati, in the county of Hamilton, and State of Ohio, have invented a new and improved Oil-Can; and I do hereby declare that the following is a full, clear, and exact description thereof, reference being had to the accompanying drawings, forming part of this specification.

The nature of my invention consists in constructing a can or vessel for the purpose of containing oil, sirups, or other liquids, provided with a vacuum handle and an adjustable nozzle, so that the nozzle may be adjusted to any desired angle with the can, and the liquid ejected or forced out in a limited quantity.

To enable others skilled in the art to make and use my invention, I will proceed to describe its construction and operation.

The figure represents a side elevation of my improved oil-can with a portion broken out.

Letters of like name and kind refer to like parts in the figure.

A may represent the cylinder of an oil-can, made of sheet metal or other suitable material, of any desired form, but I usually make them of a cylindrical form, with the top tapering in the form of a cone, so as to receive the spout or nozzle. B is a tubular handle, screwed in any convenient position to the side of the can or vessel. The tube in the handle connects with the inside of the can or vessel to which it is applied. $a$ represents any suitable number of perforations made in the handle, which connect with the inside of the tube formed by the said handle B. C is an elongated flexible bulb or ball, made of rubber or other suitable material, through which the tube or handle B passes. The bulb C is firmly secured at each end to the tube or handle, (as shown at $e\ e$,) so as to make it air-tight for its successful operation. D is a conducting-tube that extends nearly to the bottom of the vessel, as shown in dotted lines, and at the broken portion of the cylinder or vessel. This tube D is made to fit the top portion of the can, so as to be perfectly air-tight. For convenience, I usually secure them by means of a screw-thread, so the tube may be readily removed to admit the oil or such other fluid or liquid designed to be used. This tube may, however, be rigidly secured in its position, and an aperture made in the side or top of the can or vessel to admit the oil, fluid, or whatever is designed to be used, and made tight with a cork or other suitable means, as would be most desirable, convenient, and proper. At the upper end of the tube D I provide a suitable tubular joint, E, to which is connected the spout or nozzle F, which may be of any desired form or length, through which the liquid is ejected from the can or vessel. This spout or nozzle F can be adjusted to any desired angle to the body of the can or vessel, as shown in red lines in the figure. This invention is peculiarly adapted to locomotive engines and other places where it is difficult to bring a straight nozzle to the point where it is desired to apply oil. It is also convenient and useful in watering plants, as a jet of water may be forced up under the leaves and wash off the dust that collects upon the under side, so detrimental to their beauty and growth.

Having thus described my invention, what I claim as new, and desire to secure by Letters Patent, is—

1. A can or vessel for containing oil, sirups, or other liquid, provided with a vacuum handle and an adjustable nozzle, substantially as herein shown and described.

2. The nozzle F, adjustably attached to the stopper D, the latter being continued into the can to form the conducting-tube, as herein set forth for the purpose specified.

3. I also claim the combination of an adjustable nozzle with the can or vessel, substantially as herein shown and described.

MARTIN ROBBINS.

Witnesses:
  WILLIAM WINTERS,
  JNO. G. JONES.